Feb. 27, 1951 T. W. LEWIS 2,543,504
SAW SHARPENING MACHINE
Filed March 29, 1949 3 Sheets—Sheet 3
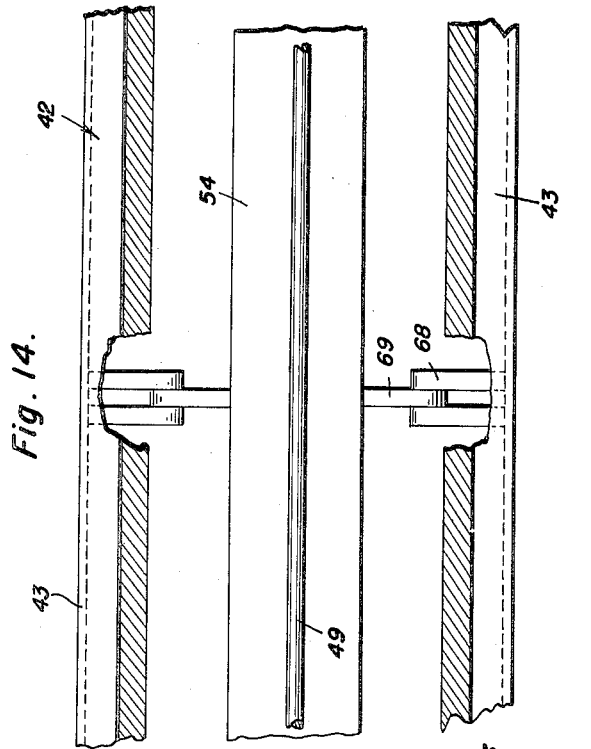
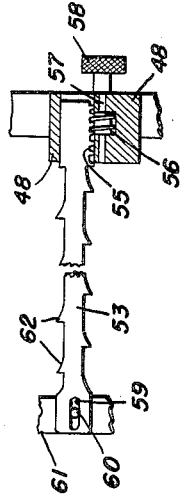
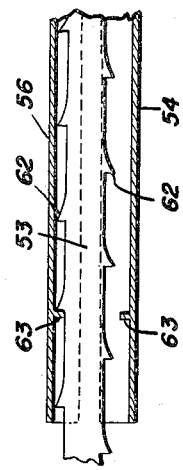
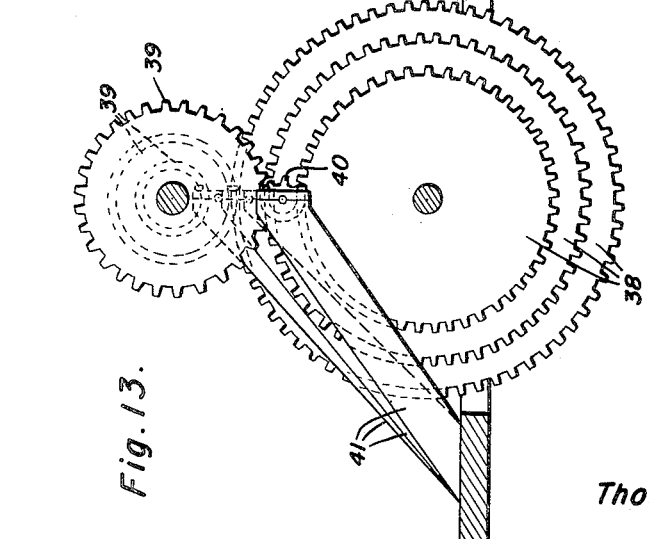
Inventor
Thomas W. Lewis Patented Feb. 27, 1951

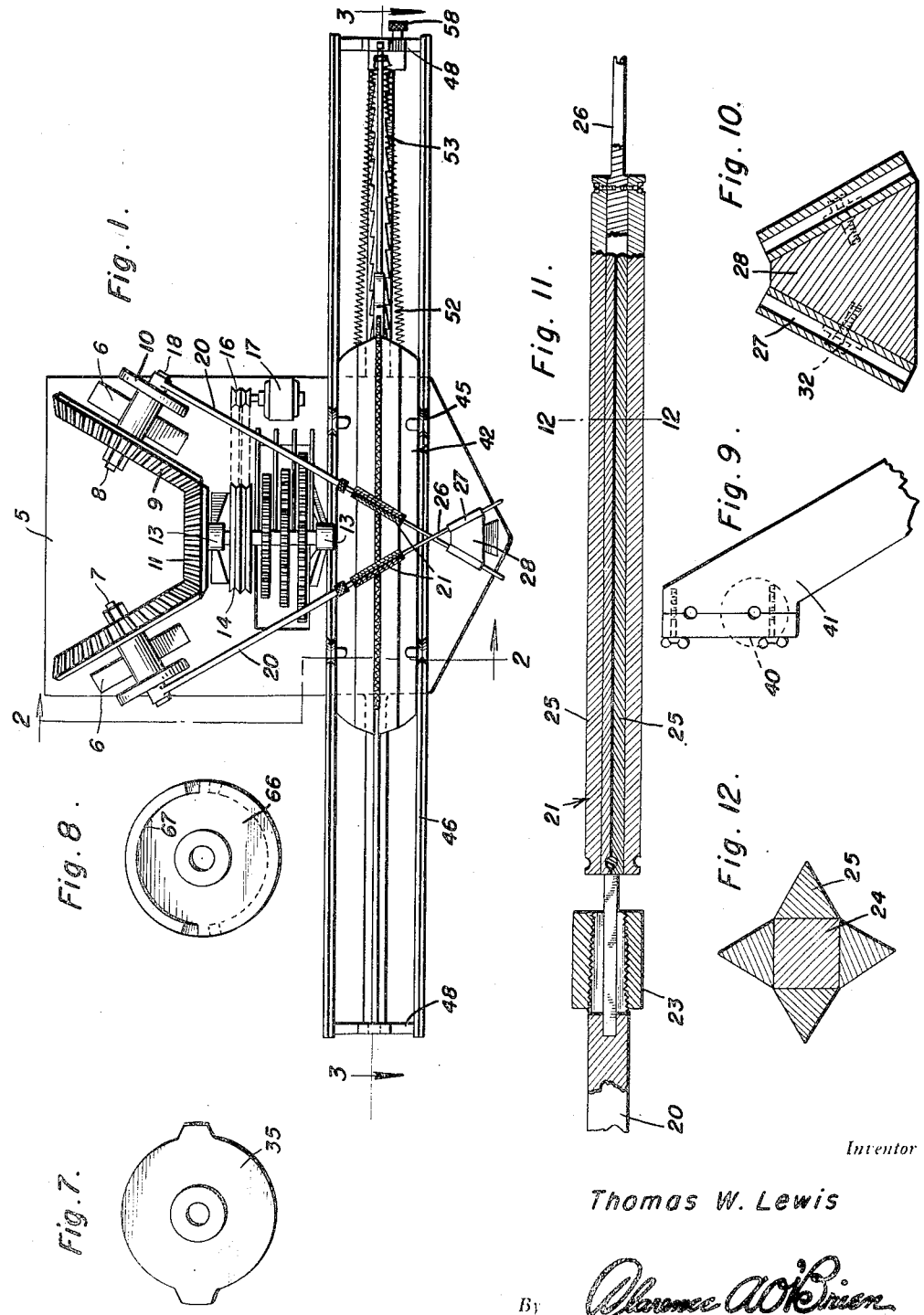

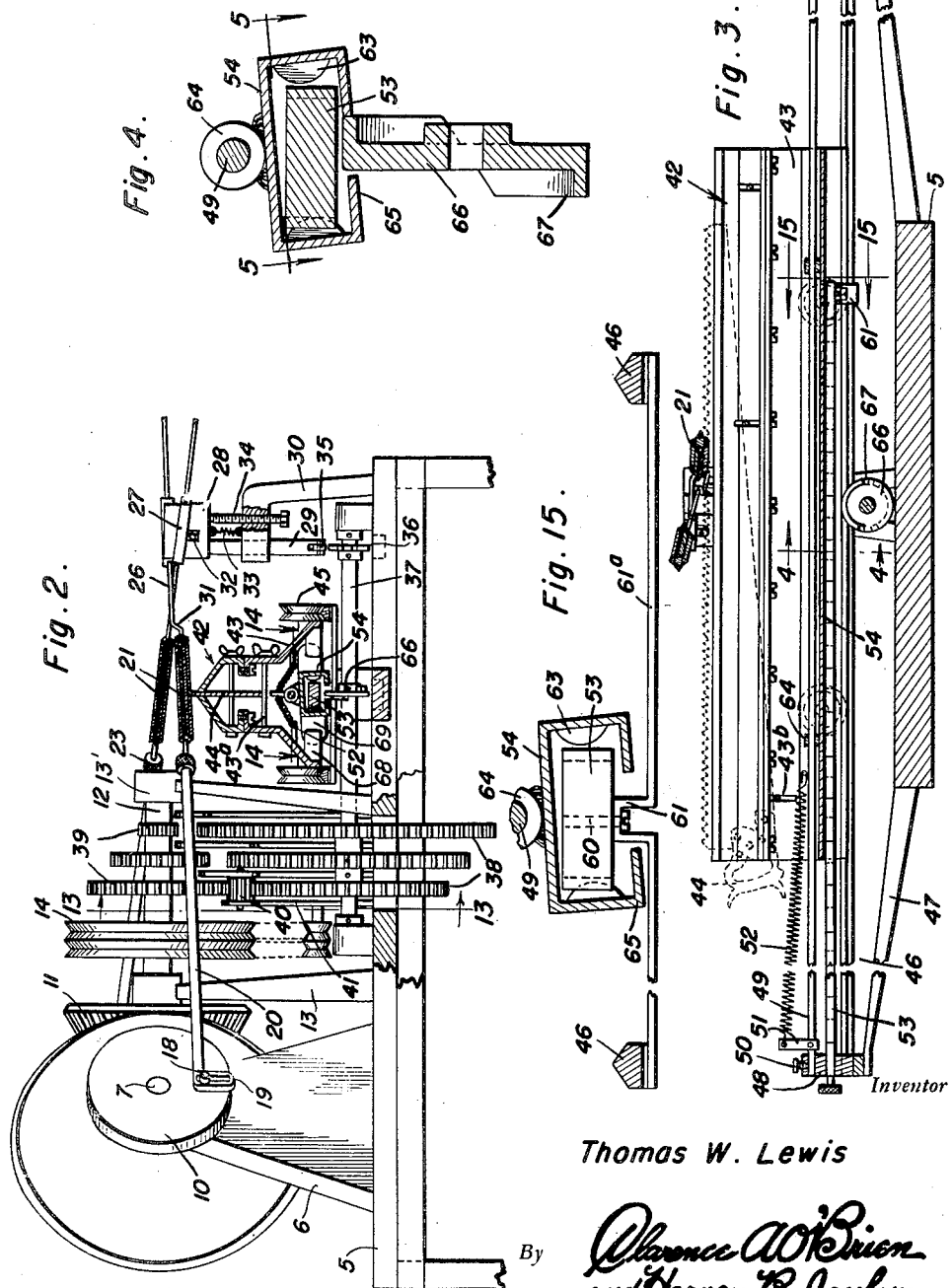

2,543,504

UNITED STATES PATENT OFFICE 2,543,504

SAW SHARPENING MACHINE

Thomas W. Lewis, Richmond, Calif.

Application March 29, 1949, Serial No. 84,065

6 Claims. (Cl. 76—31)

1

The present invention relates to new and useful improvements in saw sharpeners and more particularly to a power operated machine for reciprocating a pair of saw sharpening files as a saw travels under the files.

An important object of the invention is to mount the files angularly with respect to each other to conform to the angle of the oppositely inclined teeth and providing means for raising and lowering the files following a predetermined reciprocating sharpening movement for engaging successive teeth as the movement of the saw progresses.

A further object is to provide novel step by step feed mechanism for the saw and novel raising and lowering mechanism for the file synchronized with the saw feed mechanism and operating both mechanisms by a common countershaft.

Another object is to provide variable drive means for the countershaft.

A still further object is to provide a saw filing machine of simple and practical construction, which is efficient and reliable in operation, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a transverse sectional view taken on a line 2—2 of Figure 1;

Figure 3 is a longitudinal sectional view of the saw carriage taken on a line 3—3 of Figure 1;

Figure 4 is an enlarged fragmentary sectional view of the step by step saw carriage feed mechanism taken on a line 4—4 of Figure 3;

Figure 5 is a fragmentary sectional view taken on a line 5—5 of Figure 4;

Figure 6 is an enlarged fragmentary plan view of the adjusting means for the carriage feed rack;

Figure 7 is an enlarged side elevational view of the cam for raising and lowering the files;

Figure 8 is a similar view for the cam for controlling feeding movement of the carriage;

Figure 9 is a fragmentary side elevational view of one of the supports for the interchangeable idler gear;

Figure 10 is an enlarged sectional view of the raising and lowering block and guides for the file supporting rods;

Figure 11 is an enlarged longitudinal sectional

2 view of one of the files and attaching means therefor;

Figure 12 is a transverse sectional view taken on a line 12—12 of Figure 11;

Figure 13 is an enlarged transverse sectional view taken on a line 13—13 of Figure 2;

Figure 14 is an enlarged fragmentary longitudinal sectional view taken on a line 14—14 of Figure 2, and;

Figure 15 is an enlarged transverse sectional view taken on a line 15—15 of Figure 3.

Referring now to the drawings in detail wherein for the purpose of illustration I have disclosed a preferred embodiment of my invention, the numeral 5 designates a supporting table or bench having a pair of upstanding bearing supports 6 at one end for shafts 7 and 8 inclined with respect to each other, each shaft having a bevel gear 9 at one end and an eccentric wheel 10 at its opposite end. The bevel gears 9 are driven in opposite directions by a bevel gear 11 secured at one end of a shaft 12 journaled in upstanding bearing supports 13.

A double V-pulley 14 is secured on shaft 12 and is driven by a belt 15 from pulleys 16 of an electric motor 17.

Each eccentric wheel 10 is provided with a crank pin 18 engaged in a vertical slot 19 at one end of a pitman 20 and to the other end of which one end of a file 21 is secured by means of a chuck 22 on the end of the pitman clamping the file by a collar 23 threaded on the chuck. The files are constructed of a core 24 of square shape in cross section and to each side of which a triangular shaped file 25 is suitably secured. The other end of each file is secured to a rod 26, the rods for the pair of files being slidably supported in inclined tubular guides 27 at the opposite sides of a block 28 supported at the upper end of a push rod 29 slidably mounted for vertical movement in a support 30 rising from table or bench 5.

The pitmans 20, files 21 and rods 26 are inclined with respect to each other, the rods crossing each other forwardly of guides 27 and one rod being formed with an offset 31 to overlie the other rod and prevent interference therewith. The guides 27 are pivotally attached to block 28 by bolts or pins 32.

A coil spring 33 connects block 28 to support 30 to lower the block and an adjustable stop 34 is threaded in the support under the block to limit downward movement of the block.

A roller 35 is journaled at the lower end of push rod 29 for riding on a cam 36 secured to a countershaft 37 journalled on table or bench 5 and provided with a group of gears 38 of different ratio. A group of gears 39 of reduced ratio are secured to shaft 12 immediately above gears 38, and the respective gears of the two groups are selectively connected to each other in driving engagement by an idler gear 40 removably journaled on a group of supports 41 rising from the table or bench adjacent the respective gears, to thus drive countershaft 37 at variable speeds.

A saw carriage 42 comprises a pair of opposed elongated upstanding plates 43 forming a saw vise for clamping a saw 44 therebetween by bolts and wing nuts 43ª positioned transversely under the saw and adjustable vertically in slots 43ᵇ in the plates to accommodate saws of different widths. Wheels 45 are journalled at the lower edges of plates 43 for travelling on tracks 46 supported in an elevated position above table or bench 5 by upwardly inclined arms 47.

End plates 48 are supported at the ends of tracks 46 in which the ends of a rod 49 are secured by a set screw 50 and with a bracket 51 secured at one end of rod 49 and to which one end of a pair of coil springs 52 are attached. The other ends of the springs are attached to the side plates 43 of carriage 42 to constantly pull the carriage toward one end of the tracks.

The movement of the carriage is controlled by a step by step feed mechanism comprising a stationary rack or toothed bar 53 positioned longitudinally in an inverted channel shaped escapement member 54 in the lower portion of carriage 42. The rack bar 53 is adjustably supported at one end in one of the end plates 43 by a rack 55 at one edge of the rack bar engaged by a pinion 56 on a shaft 57 journalled in the end plate and having a manipulating knob 58. A slot 59 is formed in the other end of rack bar 53 engaging an upstanding pin 60 on an upstanding offset 61 of a cross bar 61ª suitably secured to tracks 46 to adjustably support the rack bar.

The rack bar 53 is formed with staggered teeth 62 at its opposite edges alterately engaged by opposed inturned lugs 63 on the inside of channel member 54.

One or more eyes 64 project upwardly from channel member 54 slidably and rockably supporting the same on rod 49. The lower edges of channel member 54 are formed with opposed inwardly projecting flanges 65 between which the upper edge of a disk 66 is positioned and secured to counter-shaft 37. Arcuate cam humps 67 are formed on the opposite surfaces of disk 66 adjacent its periphery for riding against the opposite flanges 65 to rock the channel member from side to side to advance the channel member in a step by step movement. The channel member 54 is connected to carriage 42 for uniform movement by means of a pair of inwardly projecting lugs 68 on the inner side of each carriage plate 43 and a pair of outwardly projecting lugs 69 on opposite sides of said member 54 slidably engaged between the lugs of the pairs 68.

In the operation of the device, the eccentrics 10 are rotated in opposite directions to oppositely drive pitmans 20 and the crank pins on the eccentrics are arranged to oppositely raise and lower the files 21 attached to the pitmans into and out of sharpening engagement with the teeth of a saw 44 held in carriage 42. The pitmans and files are reciprocated at variable speeds by changing the idler gear 40 to engage a desired pair of gears of groups 38 and 39. The vertically movable file supporting block 28 is synchronized with the movement of pitmans 20 to hold each file in an upwardly inclined position during its sharpening movement as shown in Figure 2, and the files are inclined with respect to each other to conform to the opposite pitch of the teeth for sharpening the same at a proper bevel.

The saw is advanced in a step by step movement to successively sharpen the teeth, by means of the stationary rack bar 53 along which the rockable channel member 54 moves by springs 52 under control of the lugs 63 functioning as stops and releasably engaging the teeth of the rack bar in a sliding escapement action.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A saw sharpener comprising in combination, a pair of elongated sharpening tools, a saw carriage progressively movable step by step under the tools to bring the teeth of a saw into position for engagement by the tools, individual eccentric operating mechanisms for each tool for oppositely actuating the tools comprising pitman rods having said tools rigidly connected to one end thereof, rotary cam operated means for raising and lowering the tools in synchronism with the movement of the carriage to engage successive teeth of the saw and in synchronism with the stroke of the tools whereby one tool is lowered during its sharpening stroke and the other tool is simultaneously raised during its return stroke, and an escapement for controlling movement of the carriage comprising an inverted channel-shaped member rockably mounted on the carriage, a stationary double-edged rack bar positioned longitudinally in said member, lugs on said member engaged with opposite edges of said rack bar alternately upon rocking of said member in opposite directions, and a rotary cam alternately engaging said member at opposite sides of said channel to rock said member.

2. A saw sharpener comprising in combination, a pair of reciprocating sharpening tools, a saw carriage progressively movable under the tools to bring the teeth of a saw into position for engagement by the tools, said tools being inclined according to the pitch of the oppositely inclined teeth of the saw, an eccentric operating mechanism for reciprocating the tools, pitmans connecting the tools to the eccentric mechanisms, and means for raising and lowering the tools in synchronism with the movement of the carriage to engage successive teeth of the saw, and including a vertically reciprocating push rod, and means rockably connecting the outer ends of the tools to the push rod.

3. A saw sharpener comprising in combination, a pair of reciprocating sharpening tools, a saw carriage progressively movable under the tools to bring the teeth of a saw into position for engagement by the tools, said tools being inclined according to the pitch of the oppositely inclined teeth of the saw, an eccentric operating mechanism for reciprocating the tools, pitmans connecting the tools to the eccentric mechanisms, and means for raising and lowering the tools in synchronism with the movement of the carriage to engage successive teeth of the saw, and including a vertically reciprocating push rod, a cam for actuating the push rod, and means rockably connecting the outer ends of the tools to the push rod.

4. A saw carriage for saw sharpening machines comprising a saw clamping device, and escapement for said carriage including an inverted channel shaped member rockably carried by the clamping device, a stationary double edged rack bar positioned longitudinally in the channel shaped member, opposed lugs in the channel shaped member alternately moved into the path of the teeth of the rack bar by opposite rocking movement of said member, means for rocking said member comprising a rotary cam alternately engaging said member at opposite sides of said channel, and means for moving said carriage under control of said escapement.

5. A saw sharpener comprising, in combination, a pair of reciprocating sharpening tools, a carriage movable step by step under the tools to bring the teeth of the saw into position for engagement by the tools, said tools being inclined according to the pitch of oppositely inclined teeth of the saw, means for reciprocating the tools by one end thereof oppositely with respect to each other, an escapement for controlling step-by-step movement of the carriage and including a rotary shaft, and means for raising and lowering the tools in synchronism with step-by-step movement of the carriage including a slidably mounted push rod, means pivotally connecting the tools at their other ends to one end of said push rod, and means for sliding said push rod including camming devices operated by said shaft to exert pressure against the other end of said push rod.

6. A saw sharpening device comprising a pair of reciprocating sharpening tools inclined according to the pitch of oppositely inclined teeth of the saw, means for reciprocating the tools by one end thereof oppositely with respect to each other, and means for raising and lowering the tools alternately into and out of engagement with the teeth of the saw comprising a slidably mounted push rod, means pivotally connecting the tools at the other end thereof to said push rod, a rotary driven shaft, and means for sliding said push rod including camming devices operative by said shaft to exert pressure against one end of said push rod.

THOMAS W. LEWIS.

REFERENCES CITED

The following references are of record in the file of this patent:

UNITED STATES PATENTS

| Number | Name | Date |
|---|---|---|
| 123,151 | Chapman | Jan. 30, 1872 |
| 195,633 | Murhpin | Sept. 25, 1877 |
| 255,007 | Myers | Mar. 14, 1882 |
| 456,350 | Yost | July 21, 1891 |
| 1,323,085 | Moody | Nov. 25, 1919 |
| 1,376,634 | Penny | May 3, 1921 |